(12) United States Patent
Kitani et al.

(10) Patent No.: US 7,002,330 B2
(45) Date of Patent: Feb. 21, 2006

(54) SWITCHING REGULATOR

(75) Inventors: Hiroshi Kitani, Kyoto (JP); Nobuaki Umeki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/847,439

(22) Filed: May 18, 2004

(65) Prior Publication Data

US 2004/0245974 A1    Dec. 9, 2004

(30) Foreign Application Priority Data

Jun. 4, 2003  (JP)  ............................. 2003-158734

(51) Int. Cl.
*G05F 1/40*  (2006.01)
(52) U.S. Cl. ...................... 323/284; 323/222; 323/901; 363/49
(58) Field of Classification Search ................ 323/222, 323/276, 282, 283, 284, 285, 288, 351, 901, 323/908; 363/49; 361/91.7
See application file for complete search history.

(56) References Cited

U.S. PATENT DOCUMENTS 5,739,679 A * 4/1998 Takehara et al. ............ 323/222

6,894,471 B1 * 5/2005 Corva et al. ................. 323/282
2004/0100240 A1 * 5/2004 Natsume et al. ............. 323/282

FOREIGN PATENT DOCUMENTS

| JP | 6-66292 U | 9/1994 |
|----|-----------|--------|
| JP | 07-336999 | 12/1995 |
| JP | 08-317637 A | 11/1996 |
| JP | 11-235026 A | 8/1999 |
| JP | 2002-218745 A | 8/2002 |

* cited by examiner

*Primary Examiner*—Jessica Han
(74) *Attorney, Agent, or Firm*—Arent Fox PLLC

(57) ABSTRACT

The present invention provides a switching regulator for controlling the overshoot voltage which is generated during transition from power ON, when soft start activates, to normal operation, when the load side output is maintained at the output setting voltage by the feedback circuit. A clamp circuit is disposed between a soft start circuit and an error amplifier, an upper limit value from the output of the soft start circuit (SS) to the output of the error amplifier (FB) is set, so that the rise of voltage of the output of the error amplifier (FB) is controlled when power is turned ON, and time until the output of the error amplifier (FB) is stabilized is decreased, by which the overshoot voltage generated in the load side output (VOUT) is controlled.

3 Claims, 4 Drawing Sheets

SWITCHING REGULATOR

BACKGROUND OF THE INVENTION

1. Field of the Invention

The present invention relates to a switching regulator for supplying power from the power supply to the load side via a switching element, with which a predetermined voltage at the load side (output setting voltage) can be acquired by switching this switching element under a predetermined control, and more particularly to a switching regulator that has a soft start function.

2. Description of the Related Art

As one system of acquiring output setting voltage, a switching regulator system, which switches a switching element under a predetermined control, has been conventionally used since it is compact and can implement high efficiency. In order to control rush current which flows into the switching element when power is turned ON, a soft start operation is executed (e.g. Japanese Patent Application Laid-On No. 7-336999).

FIG. 6 is a circuit diagram of a conventional switching regulator. In the switching regulator 101, the switching element 114, which is a PMOS transistor, supplies power from the power supply side (VCC) to the load side, and holds the load side output (VOUT) at the output setting voltage by switching under a predetermined control, that is, according to the output of the comparator 110, which is described later. To the load side of the switching element 114, a smoothing circuit 115, which comprises a coil, capacitor and diode, is connected for smoothing the voltage from the switching element 114. The load side voltage (VOUT) is divided by the voltage divider 116, which is composed of a serial resistor, and is input to the inversion input side of the error amplifier 111. Between the output (FB) and the inversion input side of the error amplifier 111, an oscillation stop circuit 117, which is composed of a resistor and capacitor, is connected. The error amplifier 111 amplifies the error between the error comparison reference voltage 118 and the voltage which is input to the inversion input side, and outputs the amplified error. The output of the error amplifier 111 (FB) and the output of the later mentioned soft start circuit 113 (SS) are input to the comparator 110, and the lower voltage thereof and the triangular wave voltage from the triangular wave generator (TRI) 112 are compared. The output of the comparator 110 is inverted by the inversion buffer 119, and is input to the gate of the above mentioned switching element 114. In this way, the switching element 114 is controlled by the feedback circuit from the load side output (VOUT).

The above mentioned soft start circuit 113 comprises a constant current source 122 and a capacitor 123 for generating voltage which gradually rises when power is turned ON, and further comprises a low power supply voltage malfunction prevention circuit (UVLO) 120 and a thermal shutdown circuit (TSD) 121.

The reference voltage generator (VREF) 124 is also installed, and the output thereof (Vref) is the power supply for the error amplifier 111, triangular wave generator 112 and soft start circuit 113.

FIG. 7 is a characteristics diagram showing the voltage values in transition from the time of power ON to normal operation. When power is turned ON, the voltage of the output of the soft start circuit 113 (SS) is lower than that of the output of the error amplifier 111 (FB). Therefore in the comparator 110, the output of the soft start circuit 113 (SS) and the triangular wave are compared. If the output of the soft start circuit 113 (SS) is higher than the triangular wave, high level is output from the comparator 110, which is inverted by the inversion buffer 119, and low level is input to the gate of the switching element 114. As a result, the switching element 114 closes (turns ON). If the output of the soft start circuit 113 (SS) is lower than the triangular wave, low level is output from the comparator 110, which is inverted by the inversion buffer 119, and high level is input to the gate of the switching element 114. As a result, the switching element 114 opens (turns OFF).

And in the beginning of power ON, the period when low level is input to the gate of the switching element 114 is short and the high level period is long. And by gradually increasing the low level period and decreasing the high level period, the rush current to flow into the switching element 114 is controlled.

When normal operation starts, the voltage of the output of the error amplifier 111 (FB) becomes lower than that of the output of the soft start circuit 113 (SS). Therefore in the comparator 110, the output of the error amplifier 111 (FB) and the triangular wave are compared.

If the output of the error amplifier 111 (FB) is higher than the triangular wave, the high level is output from the comparator 110, which is inverted by the inversion buffer 119, and low level is input to the gate of the switching element 114. If the output of the error amplifier 111 (FB) is lower than the triangular wave, low level is output from the comparator 110, which is inverted by the inversion buffer 119, and high level is input to the gate of the switching element 114.

SUMMARY OF THE INVENTION

As described above, in the comparator 110, the output of the soft start circuit 113 (SS) and the triangular wave are compared at power ON, and when normal operation starts, the output of the error amplifier 111 (FB) and the triangular wave are compared. The output of this soft start circuit 113 (SS) gradually rises after power ON, and asymptotically approaches the reference voltage (Vref). The output of the error amplifier 111 (FB), on the other hand, rises close to the reference voltage (Vref) immediately after power ON, and starts to drop by the function of the feedback circuit when the load side output (VOUT) exceeds the output setting voltage. By this drop, the voltage becomes lower than the output of the soft start circuit 113 (SS), and becomes the stable voltage for the normal operation.

Along with this, the load side output (VOUT) stabilizes at the output setting voltage, but a high overshoot voltage is generated during this time. In order to stabilize the load side voltage (VOUT) quickly and enable the operation of the devices related to the load side output (VOUT) quickly, this overshoot period must be decreased. Also this high overshoot voltage has the danger of damaging the devices related to the load side output (VOUT).

With the foregoing in view, it is an object of the present invention to provide a switching regulator that can control the overshoot voltage.

To solve the above problem, a switching regulator according to the present invention comprises a switching element for supplying power from a power supply side to a load side and holding the load side at an output setting voltage by switching, a voltage divider for dividing the voltage at the load side, an error amplifier for receiving voltage from the voltage divider, a triangular wave generator for generating triangular wave, a soft start circuit for generating voltage that gradually rises when the voltage at the power supply side starts up, a clamp circuit for setting an upper limit value from the output voltage of the soft start circuit to the output voltage of the error amplifier, and a comparator for comparing the lower voltage, between the output voltage of the soft start circuit and the output voltage of the error amplifier, with the triangular wave voltage, wherein the switching element is switched according to the output of the comparator.

Since the upper limit value from the output of the soft start circuit to the output of the error amplifier is set by this clamp circuit, the rise of the output voltage of the error amplifier is controlled when power is turned ON, and time until the output of the error amplifier stabilizes can be decreased, and therefore the overshoot voltage to be generated in the load side output is controlled.

In the switching regulator according to the present invention, the clamp circuit can concretely comprise a first transistor of which emitter is connected to the output of the error amplifier, and a second transistor of which base is connected to the output of the soft start circuit, and of which emitter is connected to the base of the first transistor, and of which the emitter-base voltage is smaller than that of the first transistor, and the upper limit value from the output voltage of the soft start circuit to the output voltage of the error amplifier is set depending on the difference of the emitter-base voltages.

This clamp circuit has a small number of composing elements, so an area occupied by the clamp circuit in a semiconductor integrated circuit can be decreased. Also since the number of composing element is small, the difference of the emitter-base voltages generated by the difference of the emitter-base junction areas can be adjusted relatively simply.

In another switching regulator according to the present invention, the clamp circuit can concretely comprises a first transistor of which emitter is connected to the output of the error amplifier, a second transistor of which the emitter is connected to the base of the first transistor, a third transistor of which the emitter is connected to the base of the second transistor, a resistor to which the base of the third transistor and a constant current source are connected, and a fourth transistor of which the emitter is connected to the other end of the resistor and of which base is connected to the output of the soft start circuit, and the upper limit value from the output voltage of the soft start circuit to the output voltage of the error amplifier is set depending on the difference of the emitter-base voltages between the first and second transistors, and on the voltage that is generated by the current of the constant current source flowing through the resistor.

In this clamp circuit, the voltage generated by the current flowing through the resistor is also included in the factors of setting the clamp voltage, so it is possible to increase the emitter-base junction area of the first transistor, which is related to the output of the error amplifier, and voltage can be sufficiently clamped even if the drive capability of the error amplifier is large.

DESCRIPTION OF THE PREFERRED EMBODIMENTS

Figure 1:
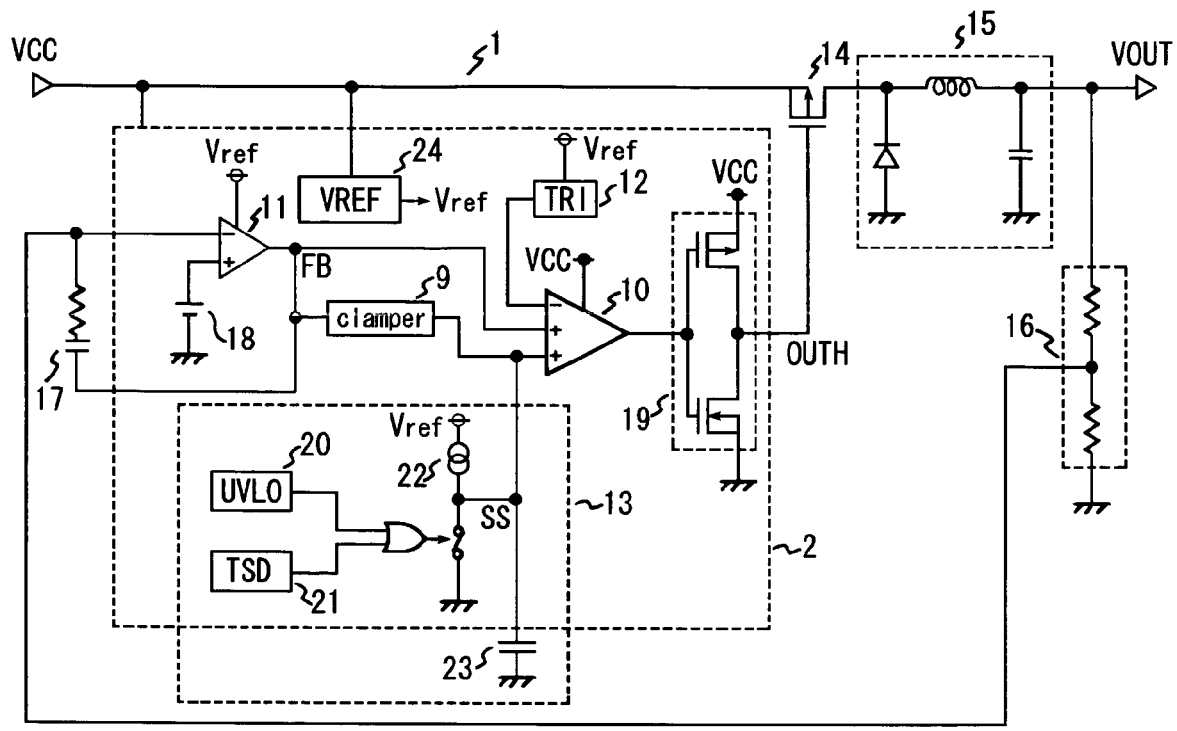
FIG. 1 is a circuit diagram depicting the configuration of the switching regulator according to an embodiment of the present invention.

Embodiments of the present invention will now be described with reference to the drawings. FIG. 1 is a circuit diagram depicting the configuration of a switching regulator according to an embodiment of the present invention. This switching regulator 1 is composed of basically the same composing elements as those described in the "Description of the Related Art", to which a later described clamp circuit is added.

In the switching regulator 1, the switching element 14 supplies power from the power supply side (VCC) to the load side, and holds the load side output (VOUT) at the output setting voltage under a predetermined control by switching, that is according to the output of the later mentioned comparator 10. At the load side of the switching element 14, a smoothing circuit 15, which comprises a coil, a capacitor and a diode, is connected, so as to smooth the voltage from the switching element 14. The load side output (VOUT) is divided by the voltage divider 16 which is composed of a serial resistor, and is input to the inversion input side of an error amplifier 11. An oscillation stop circuit 17, which is composed of a resistor and a capacitor, is connected between the output of the error amplifier 11 (FB) and the inversion input side. The error amplifier 11 amplifies the error between the error comparison reference voltage 18 and the voltage that is input at the inversion input side, and outputs it. The output of the error amplifier 11 (FB) and the output of the soft start circuit 13 (SS) are input to the comparator 10, where the lower voltage thereof and the triangular wave voltage from a triangular wave generator (TRI) 12 are compared. The output of the comparator 10 is inverted by the inversion buffer 19, and is input to the gate of the above mentioned switching element 14. In this way, the switching element 14 is controlled by the feedback circuit from the load side output (VOUT).

The above mentioned soft start circuit 13 comprises a constant current source 22 and a capacitor 23 for generating voltage which gradually rises when power is turned ON, and further comprises a low power supply voltage malfunction prevention circuit (UVLO) 20 and a thermal shutdown circuit (TSD) 21. The low power supply voltage malfunction prevention circuit (UVLO) 20 outputs high level when the power supply side voltage (VCC) is lower than a predetermined voltage, so as to forcibly fix the output of the soft start circuit 13 (SS) to the ground potential and prevent a malfunction of the switching regulator 1. In the same way, the thermal shutdown circuit (TSD) 21 prevents a malfunction of the switching regulator 1 due to abnormal high temperatures.

And in order to control the overshoot voltage of the load side output (VOUT) during the transition from power ON to normal operation, a clamp circuit (clamper) 9 is disposed between the output of the soft start circuit 13 (SS) and the output of the error amplifier 11 (FB).

The reference voltage generator (VREF) 24 supplies the output thereof, that is, the reference voltage (Vref) for the error amplifier 11, triangular wave generator 12, soft start circuit 13 and clamp circuit 9.

In the present embodiment, the switching element 14, smoothing circuit 15, voltage divider 16, oscillation stop circuit 17 and capacitor 23 are external, and the other elements are enclosed in the semiconductor integrated circuit 2.

Figure 2:
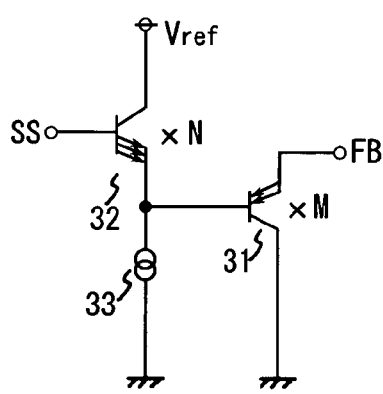
FIG. 2 is a circuit diagram depicting the configuration of the clamp circuit thereof.

Now the clamp circuit 9 will be described with reference to FIG. 2. The clamp circuit 9 is composed of a PNP transistor 31, of which the emitter-base junction area is M times (xM) the basic transistor, an NPN transistor, of which the emitter-base junction area is N times (xN) thereof, and a constant current source 33. And the emitter of the PNP transistor 31 is connected to the output of the error amplifier 11 (FB), the collector is grounded, and the base is connected to the emitter of the NPN transistor 32 and to the constant current source 33, of which the other end is grounded. The collector of the NPN transistor 32 is connected to the reference voltage (Vref), and the base is connected to the output of the soft start circuit 13 (SS).

The mask patterns of the respective basic transistor of the PNP transistor and the NPN transistor are naturally different, but the transistor characteristics are assumed to be the same. And, hereinafter, x means the ratio of the emitter-base junction area to the basic transistor. Also according to this embodiment, the value M of the PNP transistor 31 is set to 1, the value N of the NPN transistor 32 is set to 8, and the constant current source 33 is set to 10–100 μA respectively.

In the NPN transistor 32, of which base the output of the soft start circuit 13 (SS) is connected to, the emitter voltage is lower than the base for the amount of the emitter-base voltage. In the PNP transistor 31, of which emitter the output of the error amplifier 11 (FB) is connected to, the base voltage is lower than the emitter for the amount of the emitter-base voltage. Here, according to the difference between the emitter-base junction areas of the PNP transistor 31 and the NPN transistor 32, the emitter-base voltage of the PNP transistor 31 is restricted to be a voltage of about 0.1V higher than the emitter-base voltage of the NPN transistor 32.

Therefore the output of the error amplifier 11 (FB) is restricted to a voltage amount about 0.1V higher than the output of the soft start circuit 13 (SS). If the output of the error amplifier 11 (FB) is less than this, current does not flow into the PNP transistor 31, so the output of the error amplifier 11 (FB) is not influenced by the clamp circuit 9.

In the first embodiment of the clamp circuit, even if the current drive capability of the PNP transistor 31 connected to the output of the error amplifier 11 (FB) is not very high, the number of composing elements can be decreased and the cost of the semiconductor integrated circuit 2 can be decreased.

Figure 3:
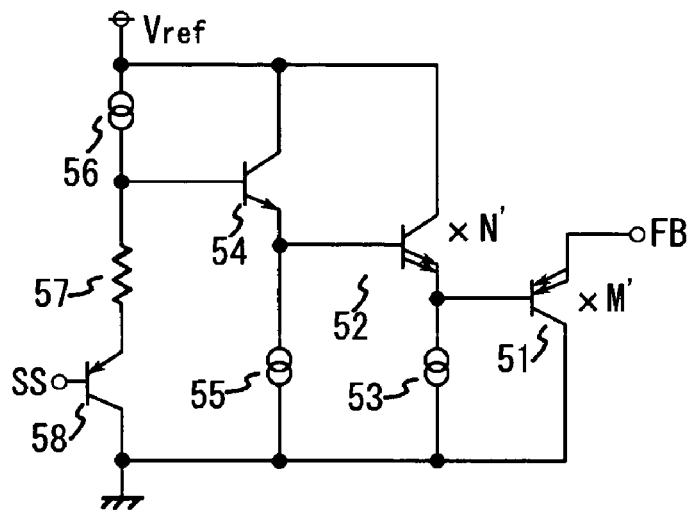
FIG. 3 is a circuit diagram depicting the configuration of the clamp circuit of the switching regulator according to another embodiment of the present invention.

Now a switching regulator, which is another embodiment of the present invention, will be described. The only difference of this from the previous embodiment is the clamp circuit, and FIG. 3 shows the circuit diagram thereof. The clamp circuit 9' is composed of a PNP transistor 51, which is xM', NPN transistor 52, which is xN', NPN transistor 54, which is x1, PNP transistor 58, which is x1, and a plurality of constant current sources 53, 55 and 56, and resistor 57.

And the emitter of the PNP transistor 51 is connected to the output of the error amplifier 11 (FB), the collector is grounded and the base is connected to the emitter of the NPN transistor 52 and to the constant current source 53, of which the other end is grounded. The collector of the NPN transistor 52 is connected to the reference voltage (Vref), and the base is connected to the emitter of the NPN transistor 54, which is x1, and to the constant current source 55, of which the other end is grounded. The collector of the NPN transistor 54 is connected to the reference voltage (Vref), the base is connected to one end of the resistor 57, and to the constant current source 56, of which the other end is connected to the reference voltage (Vref). Also the emitter of the PNP transistor 58 is connected to the other end of the resistor 57, the collector is grounded, and the base is connected to the output of the soft start circuit 13 (SS).

In this clamp circuit 9', the value M' of the PNP transistor 51 is set to 12, the value N' of the NPN transistor 52 is set to 8, the constant current sources 53, 55 and 56 are set to 10–100 μA, and the resistor 57 is set to 1 k–50 kΩ respectively. The clamp voltage of the output of the error amplifier 11 (FB), with respect to the output of the soft start circuit 13 (SS), is influenced by the ratio of the emitter-base junction areas of the transistors, but is more strongly influenced by the resistance value of the resistor 57. For example, when the constant current source 56 is 10 μA and the resistor 57 is 10 kΩ, about a 0.1V voltage is generated to the resistor 57.

In the PNP transistor 58 of which base the output of the soft start circuit 13 (SS) is connected to, the emitter voltage is higher than the base for the amount of the emitter-base voltage. The base voltage of the NPN transistor 54 is higher than the emitter of the PNP transistor 58 for the amount of 0.1V by the resistor 57. The emitter voltage of the NPN transistor 54 is lower than the base for the amount of the emitter-base voltage. If the emitter-base voltage of the PNP transistor 58 and that of the NPN transistor 54 are the same, then the emitter voltage of the NPN transistor 54 is 0.1V higher than the voltage of the output of the soft start circuit 13 (SS).

In the NPN transistor 52, the emitter voltage is lower than the base for the amount of the emitter-base voltage, and the emitter voltage of the PNP transistor 51 is higher than the base for the amount of the emitter-base voltage. Here the difference of the emitter-base voltages between the NPN transistor 52 and the PNP transistor 51 changes depending on the values N' and M', and can be much smaller than 0.1V. In this way, the output of the error amplifier 11 (FB) connected to the emitter of the PNP transistor 51 can be 0.1V higher than the output of the soft start circuit 13 (SS).

In the present embodiment, the PNP transistor 51 connected to the output of the error amplifier 11 (FB) is x12, and has a high current drive capability, so voltage can be sufficiently clamped even if the drive capability of the error amplifier 11 is large.

In the clamp circuits according to the above two embodiments, the emitter-base junction area, resistance value and current value of the constant current source are examples, and needless to say they can be arbitrarily adjusted according to the desired characteristics.

Figure 4:
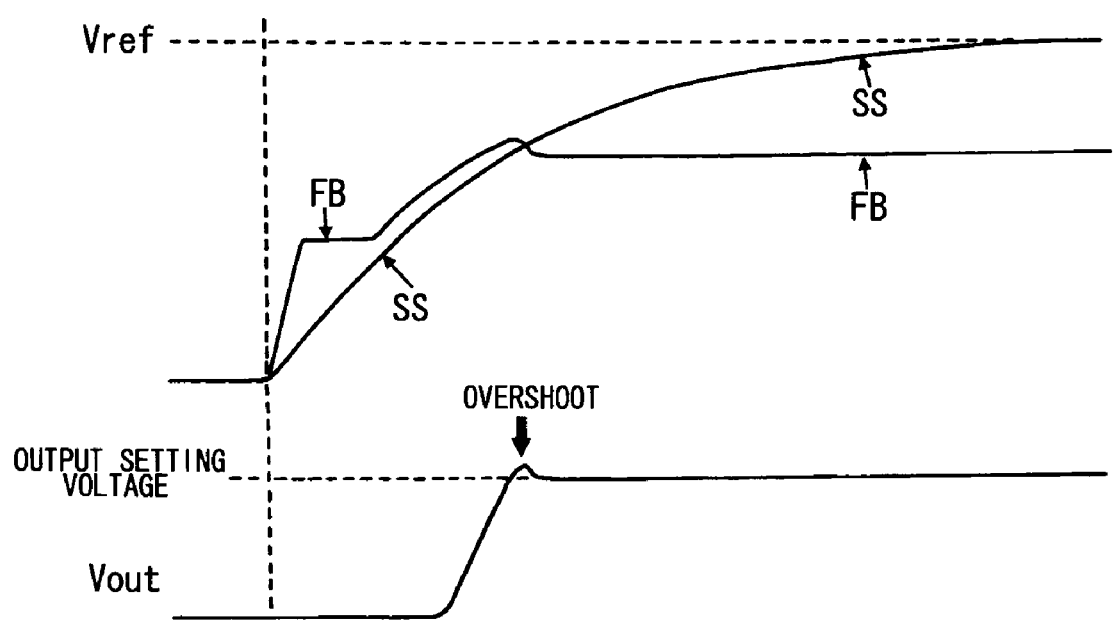
FIG. 4 is a waveform diagram depicting the transition from power ON to normal operation according to an embodiment.
Figure 5:
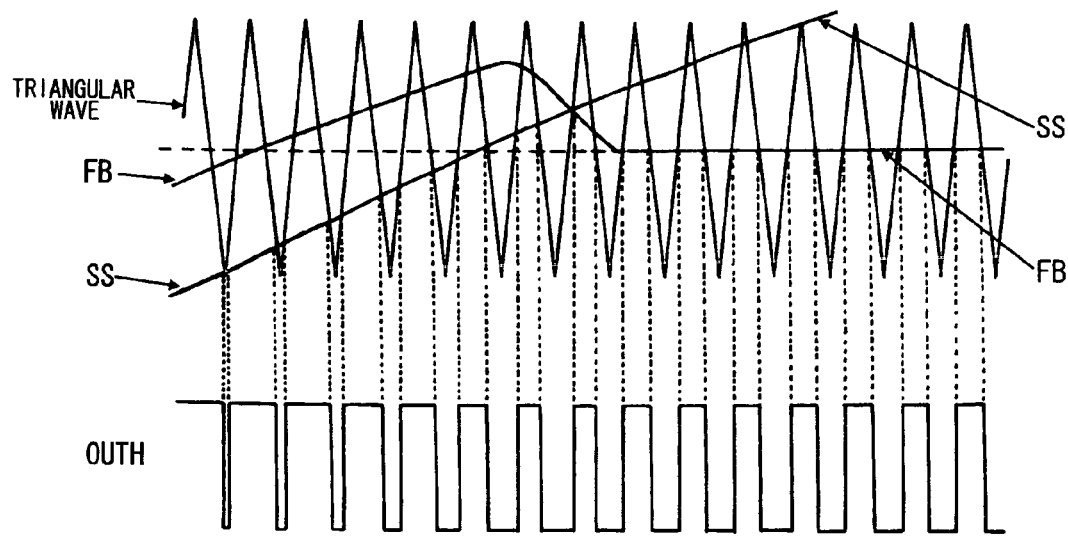
FIG. 5 is a waveform diagram depicting a moment of transition from power ON to normal operation in detail according to the embodiment.
Figure 6:
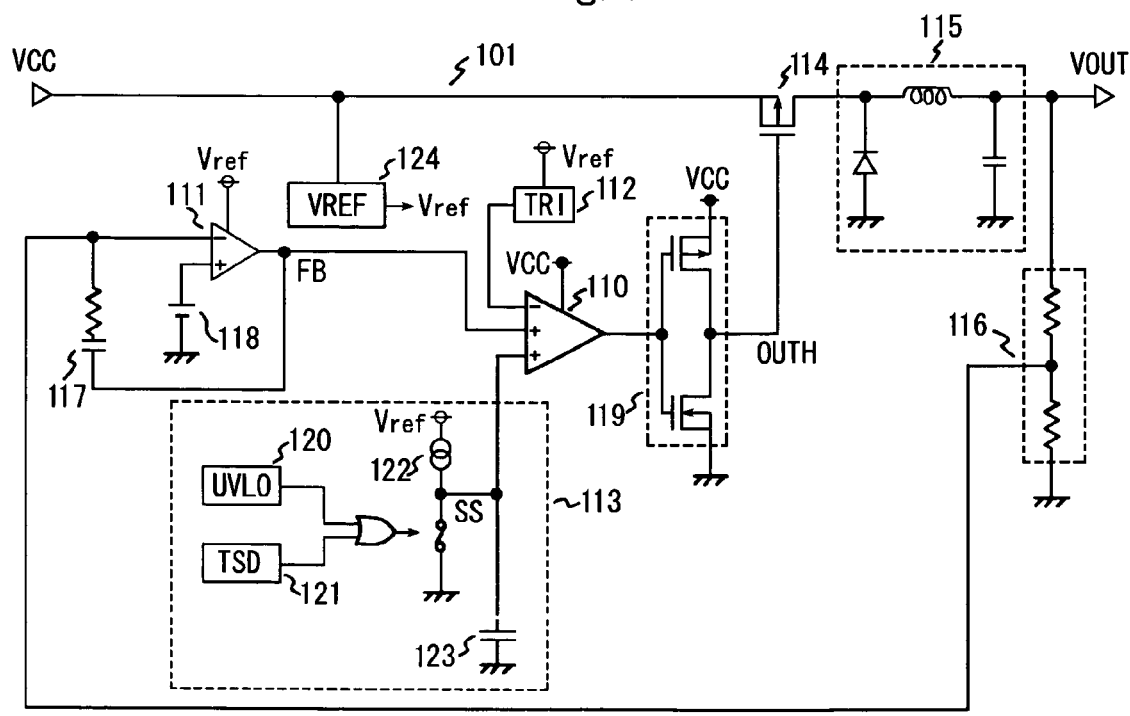
FIG. 6 is a circuit diagram depicting the configuration of a switching regulator according to a prior art.
Figure 7:
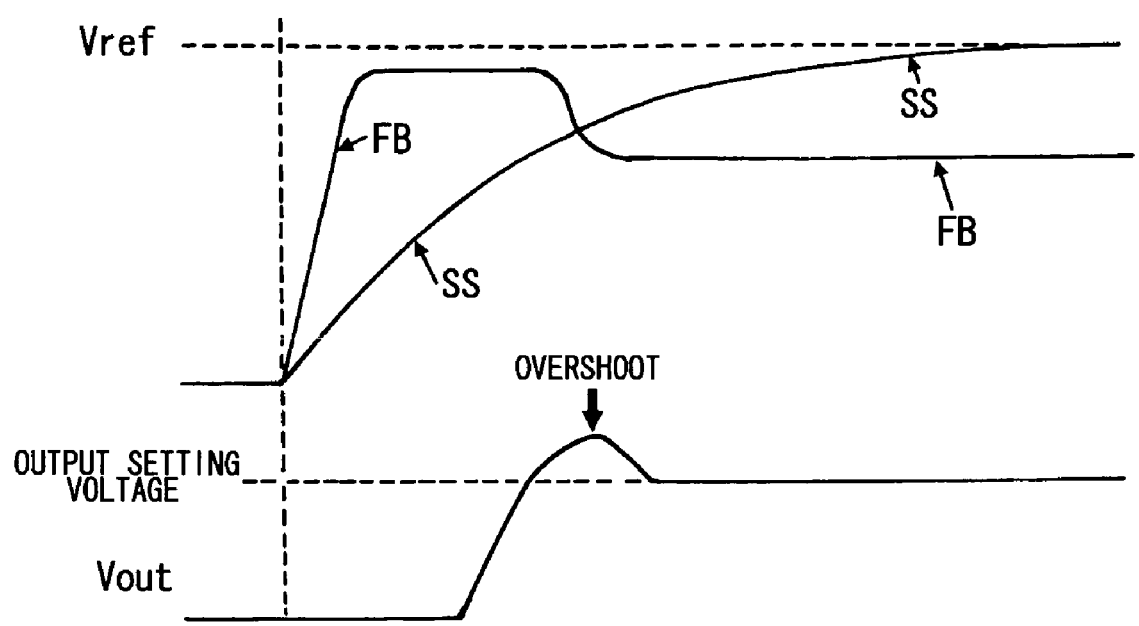
FIG. 7 is a waveform diagram depicting the transition from power ON to normal operation according to prior art.

FIG. 4 is a diagram depicting the transition from power ON to normal operation at each node. FIG. 5 is a diagram depicting the amount of the transition from power ON to normal operation in detail. When power is turned ON, the voltage of the output of the soft start circuit 13 (SS) is lower than that of the output of the error amplifier 11 (FB). Therefore in the comparator 10, the output of the soft start circuit 13 (SS) and the triangular wave are compared. If the voltage of the output of the soft start circuit 13 (SS) is higher than the triangular wave voltage, high level is output from the comparator 10, which is inverted by the inversion buffer 19, and low level is output from the output of the inversion buffer 19 (OUTH) to the gate of the switching element 14.

If the voltage of the output of the soft start circuit 13 (SS) is lower than the triangular wave voltage, low level is output from the comparator 10, which is inverted by the inversion buffer 19, and high level is output from the output of the inversion buffer 19 (OUTH) to the gate of the switching element 14.

When normal operation starts, the voltage of the output of the error amplifier 11 (FB) is lower than that of the output of the soft start circuit 13 (SS). Therefore in the comparator 10, the output of the error amplifier 11 (FB) and the triangular wave are compared. If the voltage of the output of the error amplifier 11 (FB) is higher than the triangular wave voltage, high level is output from the comparator 10, which is inverted by the inversion buffer 19, and low level is output from the output of the inversion buffer 19 (OUTH) to the gate of the switching element 14. If the voltage of the output of the error amplifier 11 (FB) is lower than the triangular wave voltage, low level is output from the comparator 10, which is inverted by the inversion buffer 19, and high level is output from the output of the inversion buffer 19 (OUTH) to the gate of the switching element 14.

The output of the soft start circuit 13 (SS) gradually rises after the power ON, and asymptotically approaches the reference voltage (Vref). The output of the error amplifier 11 (FB) rises after power ON to the voltage with which the clamp circuit 9 (or 9') operates normally, then is clamped to the voltage which is 0.1V (clamp voltage) higher than the output of the soft start circuit 13 (SS). When the load side output (VOUT) exceeds the output setting voltage, the output of the error amplifier 11 starts to drop by the function of the feedback circuit. Then the output of the error amplifier 11 starts lower than the output of the soft start circuit 13 (SS) and becomes a stable voltage at normal operation. The output of the error amplifier 11 (FB) has been clamped by the clamp circuit 9 (or 9'), and the voltage difference to be dropped to the stable voltage is small.

Along with this, the load side output (VOUT) is also stabilized at the output setting voltage. This period when the overshoot voltage is generated is shorter since the output of the error amplifier 11 (FB) has been clamped by the clamp circuit 9 (or 9'). The value of the overshoot voltage is also controlled.

The above embodiments are examples for describing the present invention, where a step-down type switching regulator is used for the description, but the present invention may be applied to a step-up type switching regulator by changing the configuration and the wiring of the switching element 14 and the smoothing circuit.

The present embodiment is not limited to the above mentioned embodiment, but the design can be changed in various ways within the scope of the particulars stated in the claims.

What is claimed is:

1. A switching regulator, comprising:
   a switching element for supplying power from a power supply side to a load side and holding the load side at an output setting voltage by switching;
   a voltage divider for dividing voltage at said load side;
   an error amplifier for receiving voltage from said voltage divider;
   a triangular wave generator for generating triangular wave;
   a soft start circuit for generating voltage that gradually rises when the voltage at said power supply side starts up;
   a clamp circuit for setting an upper limit value from the output voltage of said soft start circuit to the output voltage of said error amplifier; and
   a comparator for comparing the lower voltage between the output voltage of said soft start circuit and the output voltage of said error amplifier, with said triangular wave voltage, wherein
   said switching element is switched according to the output of said comparator.

2. The switching regulator according to claim 1, wherein said clamp circuit further comprises:
   a first transistor of which emitter is connected to the output of said error amplifier; and
   a second transistor of which base is connected to the output of said soft start circuit, and of which emitter is connected to the base of said first transistor, and of which the emitter-base voltage is smaller than that of said first transistor, and
   said upper limit value from the output voltage of said soft start circuit to the output voltage of said error amplifier is set depending on the difference of said emitter-base voltages between said first and second transistors.

3. The switching regulator according to claim 1, wherein said clamp circuit further comprises:
   a first transistor of which emitter is connected to the output of said error amplifier;
   a second transistor of which emitter is connected to the base of said first transistor;
   a third transistor of which emitter is connected to the base of said second transistor;
   a resistor to which the base of said third transistor and a constant current source are connected; and
   a fourth transistor of which emitter is connected to the other end of said resistor and of which base is connected to the output of said soft start circuit, and
   said upper limit value from the output voltage of said soft start circuit to the output voltage of said error amplifier is set depending on the difference of the emitter-base voltages between said first and second transistors and voltage that is generated by the current of said constant current source flowing through said resistor.

* * * * *